United States Patent [19]

Barrom

[11] Patent Number: 5,875,809
[45] Date of Patent: Mar. 2, 1999

[54] ACCESSORY FAUCET FOR PURIFIED WATER IN A DISHWASHER AIR GAP SYSTEM

[76] Inventor: Robert David Barrom, 28491 El Peppino, Laguna Niguel, Calif. 92677

[21] Appl. No.: 850,175

[22] Filed: May 2, 1997

[51] Int. Cl.[6] .................................. E03C 1/04; E03C 1/12
[52] U.S. Cl. ............................................. 137/216; 137/801
[58] Field of Search ...................................... 137/216, 801

[56] References Cited

U.S. PATENT DOCUMENTS

| 4,134,419 | 1/1979 | Richetti | 137/216 |
| 5,713,385 | 2/1998 | Traylor | 137/216 |

*Primary Examiner*—Gerald A. Michalsky
*Attorney, Agent, or Firm*—Richard T. Holzmann

[57] ABSTRACT

An in-line accessory faucet having a separable plastic air gap module for use with an activated carbon purification unit bypassing thereby dishwasher waste water conduits. An improved air gap module prevents contaminated effluent dishwasher water from backing up into the dishwasher while providing a source of purified water to pass therethrough to an accessory faucet. A molded plastic outer body defines a contaminated water inlet conduit adjoining a contaminated water outlet conduit in which a removable splash plate is positioned on top of the outer body having a slotted air gap cover defining an air gap chamber coupling said waste water inlet to said waste water outlet placed overall, wherein the improvement comprises a third conduit disposed within the outer body for allowing passage of purified water without contamination therethrough from a water purification system. Said third conduit is molded as an integral portion of the outer body adjacent to a wall separating the inlet and outlet conduits. Said splash plate having a hole therein fitted with a short piece of threaded tubing for connection with said third conduit at the lower end and connection with a spout assembly having an on/off valve and a handle for actuating said valve at the upper end.

4 Claims, 2 Drawing Sheets

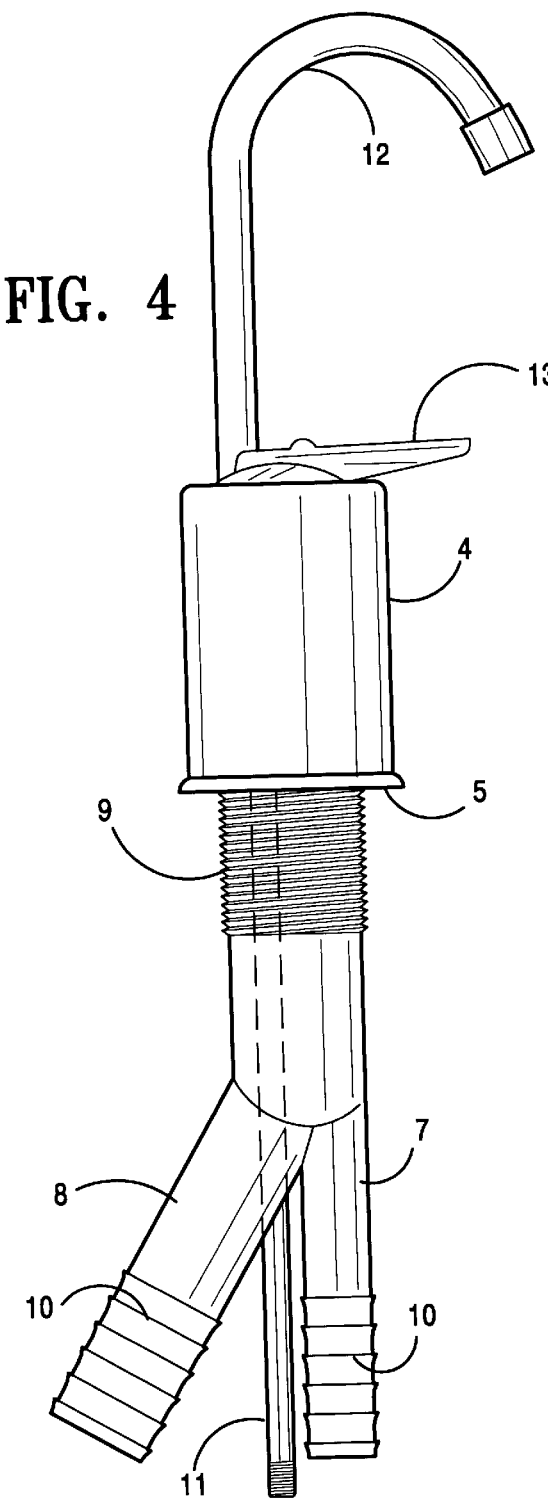
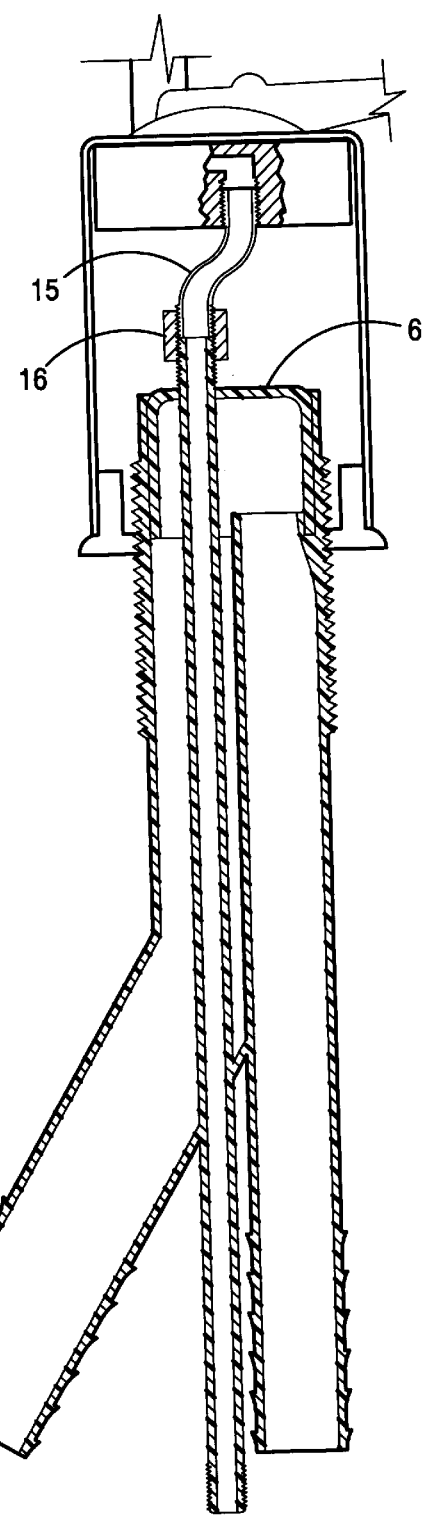
FIG. 4
FIG. 5
FIG. 6

ACCESSORY FAUCET FOR PURIFIED WATER IN A DISHWASHER AIR GAP SYSTEM

FIELD OF THE INVENTION

This invention relates to a water spout coupled within an air gap of a sink, and more particularly, one to accommodate a water purification system.

BACKGROUND

Conventional kitchen sinks today, particularly in low to medium priced houses, as well as in so-called tract houses and many commercial facilities, have four holes on the sink lip. Three of these are used to accommodate a typical faucet assembly (single or double handle) requiring two of the holes for incoming hot and cold water and the third for waste connected to the sink drain of the primary plumbing system.

It is very common for the large majority of homes to have a dishwasher adjacent to the kitchen sink. The fourth hole is used therefore, to accommodate an air gap or vent whose function is designed to prevent waste water from the dishwasher machine from being siphoned back into the dishwasher and is usually mandated by local government regulations. Approved air gap combination plumbing fixtures are available for mounting on a sink or drainboard, usually well away from the faucet which dispenses tap water. Such available air gaps usually consist of three elements: a one-piece molded plastic outer body having inlet and outlet conduits therein with a recess provided in the top of the outer body encompassing the upper ends of both conduits, a removable plastic splash plate fitted into the top of the outer body, and covered overall, to form an air chamber, with a chrome plated cover for cosmetic reasons. A compression nut is provided for screwing onto the outer body to grip the drainboard. These dishwasher waste lines have to be of sufficiently large diameter to handle solid food particles which otherwise would have a tendency to, over time, plug the waste lines.

Furthermore, due to the great variations of potable water quality in this country, many homeowners are either purchasing bottled water or installing water purification systems in their kitchen plumbing systems at significant expense. The two major systems in use for home residence water purification employ either activated carbon or reverse osmosis (RO). The former removes primarily organic molecules which substantially improves the taste as well as removing any obnoxious odors; while the latter, by means of a semipermeable membrane, concentrates undesirable electrolytes thereby requiring disposal of the concentrated waste water. An activated carbon cartridge costs only about fifty dollars, whereas the RO system costs about three hundred to five hundred dollars, these costs exclude installation. In addition, the activated carbon system purifies all the water including filtering fine particle solids, loading up the cartridge for subsequent disposal. Each cartridge has the capability of producing from about 400–600 gallons of treated water. Consequently, carbon systems are a much less expensive way to improve the quality of drinking water and are in great demand. Once installed, when the cartridge is loaded with contaminants it is easily removed and can be replaced by the homeowner in a few minutes. With these purification systems comes a designated drinking water spout.

A problem arises when the homeowner, already having an air gap for his dishwasher, decides to set-up for the inexpensive activated carbon purification system, or for any purified water system for that matter, since the sink lip has no additional opening to accommodate the purified water spout. The plumbing contractor will therefore usually offer the homeowner two options, the one is to replace the entire faucet system, while the other is to drill a new hole in the sink lip. The first option is significantly more expensive, while the second involves the risk that drilling through the porcelain-coated cast iron sink body will result in chipping and/or cracking. Actually, many plumbers today will require the homeowner to sign a disclaimer thereby waiving any damage to the sink should they select the drilling option.

There are a number of prior art patents which have addressed this problem but only insofar as it relates to the use of reverse osmosis water purification systems in the absence of a dishwasher. For example, U.S. Pat. Nos. 3,620,241 to Brown; 4,635,673 to Gerdes; 4,771,485 to Traylor; 4,967,784 to Barhydt; and 5,127,427 to Kajpust et al all teach various aspects of solutions to air gap/reverse osmosis waste water problems. Unfortunately, none of these are concerned with the far more prevalent problem of the inexpensive and simple conversion of an existing air gap/dishwasher combination so as to provide a purified water spout in the same sink opening. These prior art patents fail to direct attention to the existence of the dishwasher in the vast majority of not only new, but even older homes in this country today. Furthermore, the question of water conservation does not enter into the reverse osmosis equation. Yet, the reverse osmosis system produces a continuous flow of waste water actually generating more contaminated waste water than it does drinking water, whereas the activated carbon approach generates no waste water at all.

Therefore, there has been and is now a long-felt, unmet need to provide a low-cost, simple, easily manufactured, installed and maintained approach to solve this problem associated with a dishwasher installation using the existing fourth hole already available in the conventional four-opening sink lip. It should be mentioned that five hole sinks can be obtained by special order at a higher cost but this is hardly the way to proceed when one already has a four hole sink.

Other objects and advantages of the present invention will become apparent as the disclosure proceeds.

SUMMARY OF THE INVENTION

An improved air gap module for preventing contaminated effluent dishwasher water from backing up into a dishwasher of the type in which an outer body defining a dishwasher effluent water inlet conduit adjoining a dishwasher effluent water outlet conduit in which a removable splash plate is positioned on top of the outer body having an air gap cover placed overall for providing an air gap chamber coupling said inlet to said outlet, wherein the improvement comprises:

the outer body being formed of molded plastic to provide a strongly combined structure for preventing cross-contamination between the purified water and the effluent water and being adapted at its lower end for allowing attachment of hoses to lower ends of the dishwasher effluent water inlet and the dishwasher effluent water outlet conduits for connection to a dishwasher and to a sink drain respectively; and a third conduit, threaded at both ends for securing at both ends thereof, being molded as an integral portion of the outer body adjacent to an inner wall separating said inlet and said outlet conduits, said third conduit disposed within the outer body for allowing passage therethrough of purified water from a water purification module to a purified water delivery system without contamination. Said splash plate having a hole therein said hole being fitted with a short piece of threaded tubing for connection with said third conduit at the lower thereof further comprising a spout assembly at the upper end for connection thereto. Said air gap cover having a slot therein for receiving said spout assembly which assembly further comprises an on/off valve and a handle operably connected to said valve for delivering the purified water supply.

BRIEF DESCRIPTION OF THE DRAWINGS

The above and other objects, features and other advantages of the present invention will be more clearly understood from the following detailed description taken in conjunction with the accompanying drawings, in which:

FIG. 4 is a perspective longitudinal side view illustrating the placement of an airgap cover, a valve handle and a water spout of the illustrative embodiment of the invention;

FIG. 5 is a perspective, longitudinal, cross-sectional, side view of FIG. 4 showing the interconnection of the short flexible threaded tubing; and FIG. 6 is a top view of the slotted cover and/or splash plate.

DETAILED DESCRIPTION OF THE PREFERRED EMBODIMENT

The preferred embodiment of the improved air gap of this invention accommodates inlet and outlet waste water conduits from a dishwasher associated with an activated carbon unit, or other non-waste water producing purification system, so that the air gap arrangement provides an air gap chamber coupling the inlet to the outlet while a third conduit delivers purified water to a spout.

Figure 1:
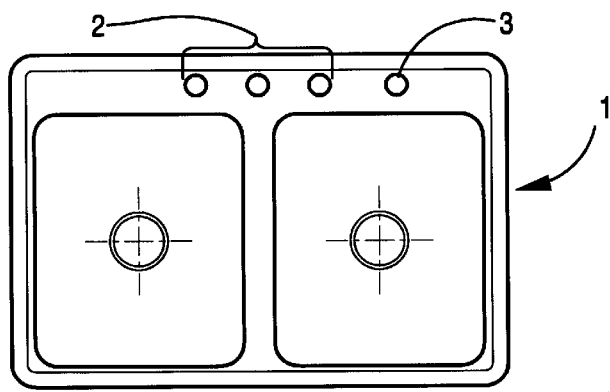
FIG. 1 is a perspective top view of a conventional double sink having four holes therein.
Figure 2:
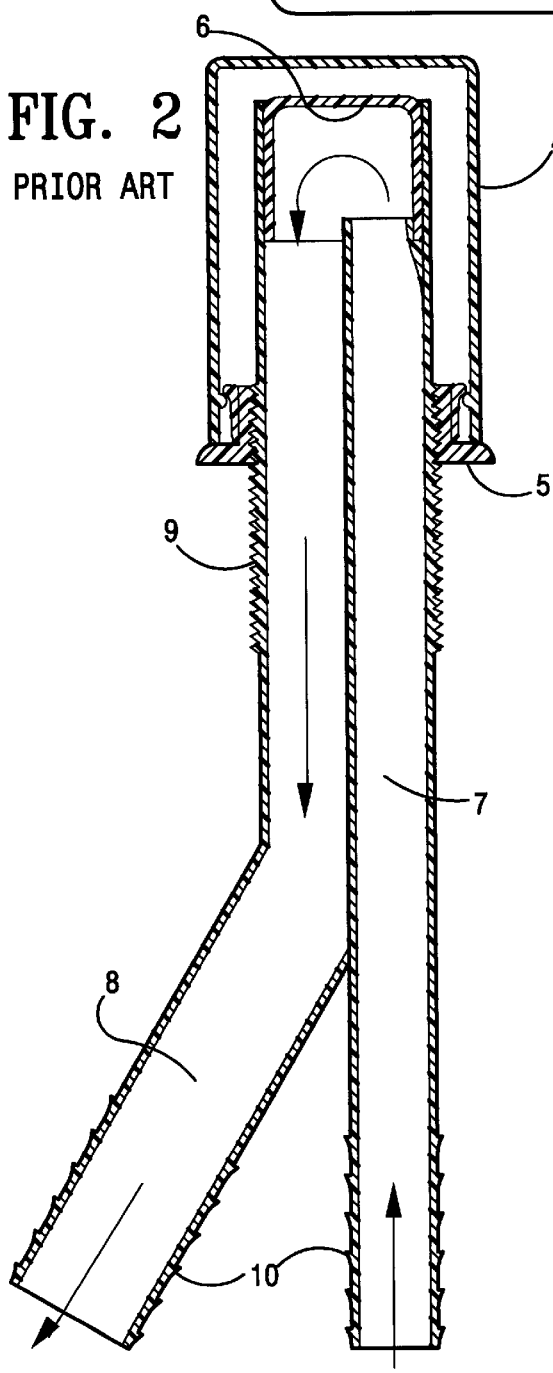
FIG. 2 is a longitudinal sectional side view of a conventional air gap/dishwasher fixture illustrating the dishwasher waste inlet and outlet conduits and the air gap and cover.

A top view of a convential kitchen sink 1 is shown in FIG. 1. Element 2 represents the three holes used for the single or double faucet assembly, while element 3 represents the fourth hole generally used for the air gap to service the adjacent dishwasher. FIG. 2 illustrates, in cross section, the structure of a conventional dishwasher waste water system wherein 4 is an air gap cover, normally of chrome-plated metal for appearance only, 5 a mounting nut usually of brass, 6 is a plastic splash plate tightly fitted (though easily removable) into the upper end of outer body 9. In this illustrative embodiment, a dishwasher waste water inlet conduit 7 is coupled to the inside of outer body 9 as is a dishwasher waste water outlet conduit 8 forming a one-piece molded element.

The waste water passes upwardly through the waste water inlet conduit into the air gap fixture and then to the outlet conduit. The air gap is required by most local plumbing code ordinances to be about an inch in length to prevent back-siphoning.

Outer body 9 is partially threaded as shown in order to couple therewith the mounting nut 5. Inlet and outlet conduits 7 and 8 respectively have barbs 10 on their lower ends to allow easy hook-up to rubber tubing but making the rubber tubing somewhat difficult to remove to insure their holding well under dishwasher effluent water pressure. It should be noted that inlet conduit or pipe 7 typically, in the commercially available models, has an inside diameter (I.D.) of ⅝ inch, whereas outlet pipe 8 has an I.D. of ⅞ inch in order to insure that there will be little chance of blockage by solid food particle waste from the dishwasher. On the other hand, it must be pointed out that all reverse osmosis and other water purification systems in commercial use employ tubing of ¼ inch diameter, completely unsuited to dishwasher effluent due to the solids content problem. The typical Y-shaped outer body having therein inlet and outlet tubings 7 and 8 made of molded plastic, threaded and barbed as shown has a retail selling price of only a couple of dollars.

Figure 3:
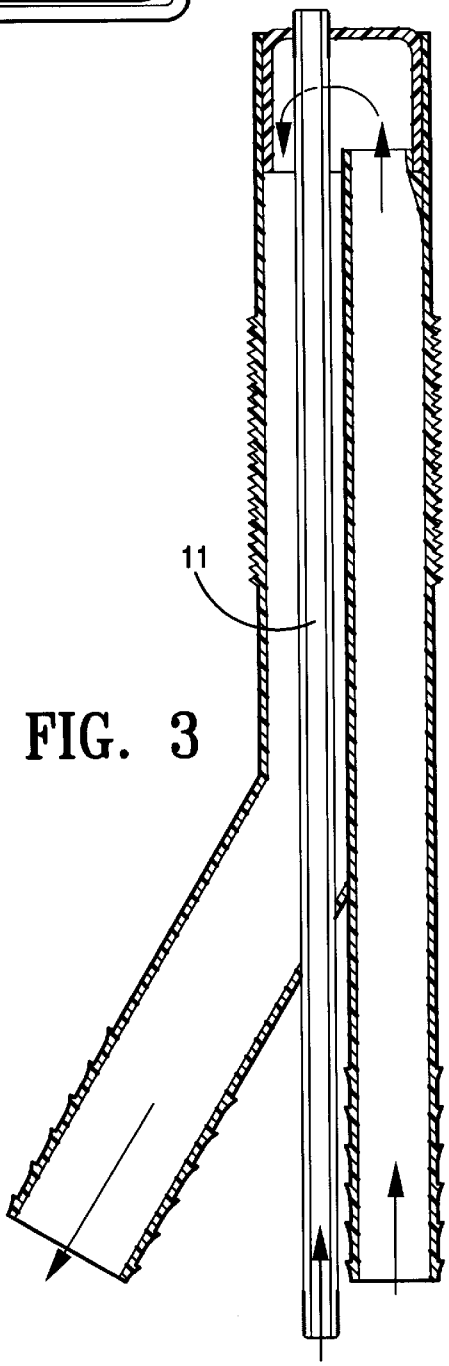
FIG. 3 is a partial longitudinal sectional side view of FIG. 2 provided with a purified water conduit extending therethrough to a water spout (not shown) of the embodiment of the invention.

Turning to FIG. 3, one can see the conventional air gap/dishwasher fixture assembly of FIG. 2 fitted with a ¼ inch tubing 11 to handle the flow of purified water either from an activated carbon filter or other non-waste water producing purification system. Tubing 11, is threaded at both ends. In the preferred best mode embodiment, tubing 11 is manufactured by molding the plastic outer body 9 containing inlet and outlet conduits 7 and 8 so that tubing 11 is a part of the single molded piece adjoining and parallel to the longitudinal common wall of 7 and 8 with 11 being bent at the bottom (not shown) to allow tubing 7 to remain barbed for easy coupling with the rubber hose.

In FIG. 4 one finds a side perspective view of the instant invention. Element 4 of FIG. 1 is no longer the conventional air gap cover but rather has a slot in its top (see FIG. 6) for receiving a conventional spout assembly which assembly comprises a spout 12, a handle 13 operatively coupled to a valve (not shown) to move the valve from a closed to an open position for delivering the purified water on demand. Such spout/handle/valve assemblies are commercially available at an inexpensive cost of about twenty dollars.

To provide purified drinking water capability to a conventional air gap/dishwasher system becomes therefore a simple and very inexpensive option. Assuming that the water purification system, either an activated carbon cartridge or other non-waste water producing system has already been placed in position attached to a branch of the main water supply, one needs to disconnect the rubber hoses from the inlet 7 and outlet 8 conduits, disassemble the Y-shaped outer body 9 from mounting nut 5, having first removed the air gap cover 4 and the splash plate 6.

The device of this invention as shown in FIG. 4, having a conduit 11 in intimate contact with the wall between the conduits 7 and 8, is then hooked-up to the dishwasher through the rubber hoses attached to the barbed ends 10 of tubings 7 and 8. The lower end of conduit 11 is then attached to the purification system. This assembly is then raised through opening 3 of the sink and fixed in place by threading mounting nut 5 to the outer body 9 allowing the flange of 5 to contact the top surface of sink 1 providing the required rigidity necessary to the system.

Splash plate 6 having either a hole therein for receiving conduit 11, or another configuration such as a short tubing 15 with threaded ends being an integral part thereof, is attached through a union 16 to the upper end of tubing 11. The spout assembly consisting of spout 12 and handle 13, as well as the on/off valve (not shown), is then top mounted by placing it down through the slot 14 in the top of airgap cover 4 and attaching it to the top of tubing 11 thereby completing the installation.

The effect of this invention is to permit a householder to obtain a purified drinking and cooking water supply at very low cost. The advantages of this invention over conventional approaches are many. First, there is no need to assume the risk and expense of drilling a new hole in the sink. Secondly, the Y-shaped outer body now containing the purified water conduit is preferably molded of plastic as is the original at a total cost of still only a few dollars. There is no chance of contamination with the water effluent of the dishwasher. The cost of the spout assembly is fixed in any case. Only the splash plate and air gap cover need to be slightly modified from present industrial practice. Furthermore, even the homeowner having only slight mechanical aptitude can do the installation himself avoiding expensive installation costs.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An improved air gap module for preventing contaminated effluent dishwasher water from backing up into a dishwasher of the type in which an outer body defining a dishwasher effluent water inlet conduit adjoining a dishwasher effluent water outlet conduit in which a removable splash plate is positioned on top of the outer body having an air gap cover places overall for providing an air gap chamber coupling said inlet to said outlet, wherein the improvement comprises:

the outer body being formed of molded plastic to provide a strongly combined structure for preventing cross-contamination between the purified water and the effluent water and being adapted at its lower end for allowing attachment of hoses to lower ends of the dishwasher effluent water inlet and the dishwasher effluent water outlet conduits for connection to a dishwasher and to a sink drain respectively; and a third conduit, threaded at both ends for securing at both ends thereof, being molded as an integral portion of the outer body adjacent to an inner wall separating said inlet and said outlet conduits, said third conduit disposed within the outer body for allowing passage therethrough of purified water from a water purification module to a purified water delivery system without contamination.

2. The air gap module as defined in claim 1 wherein said splash plate having a hole therein said hole being fitted with a short piece of threaded tubing for connection with said third conduit at the lower end thereof further comprising a spout assembly at the upper end for connection thereto.

3. The air gap module as defined by claim 1 wherein said air gap cover having a slot therein for receiving said spout assembly.

4. The air gap module as defined by claim 3 wherein said spout assembly further comprises an on/off valve and a handle operably connected to said valve for delivering the purified water supply.

* * * * *